June 3, 1930.  E. S. CLARKSON  1,761,874
FREIGHT CONTAINER CAR
Filed March 19, 1929
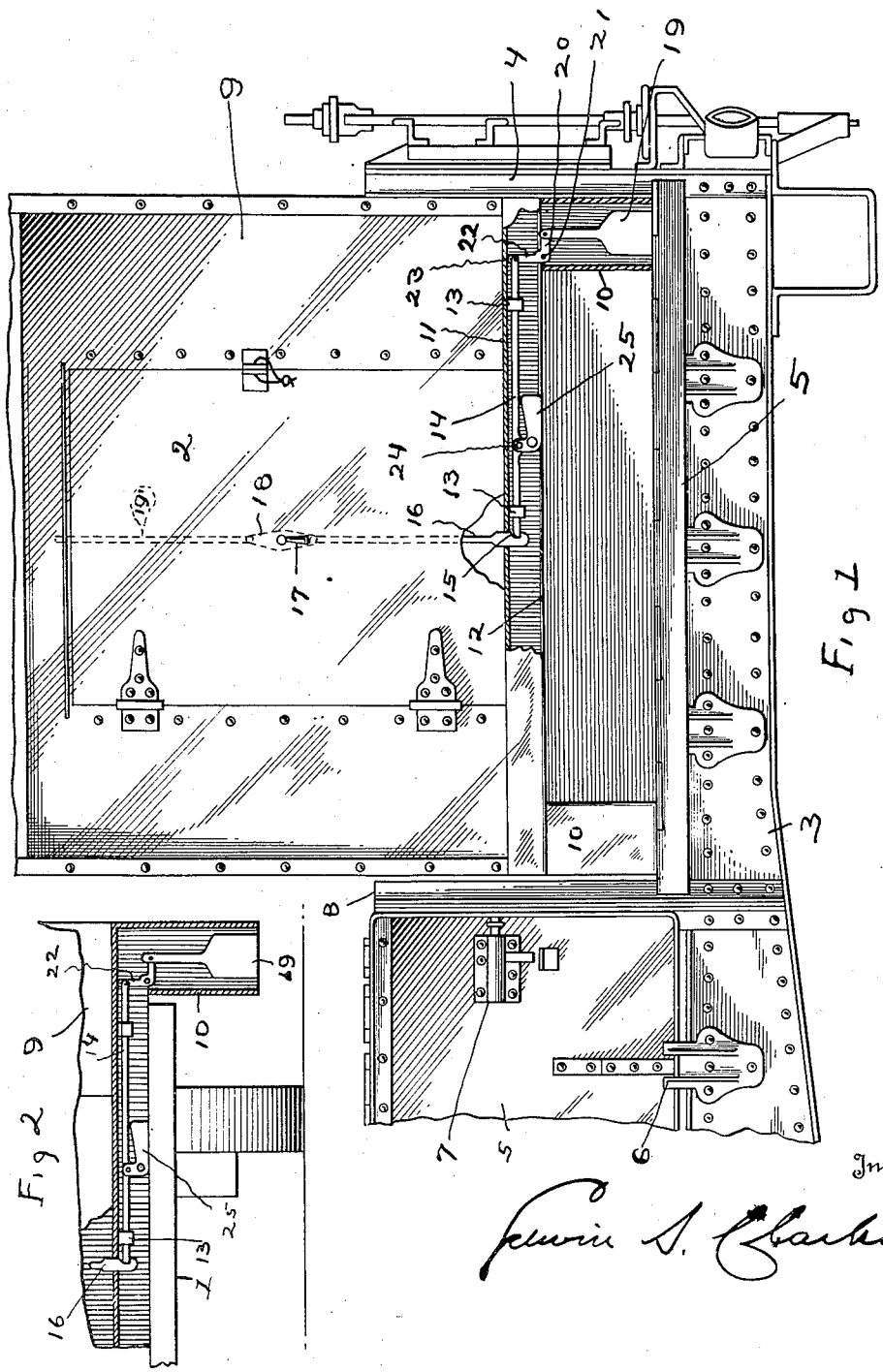
Inventor
Edwin S. Clarkson Patented June 3, 1930

1,761,874

UNITED STATES PATENT OFFICE

EDWIN S. CLARKSON, OF WASHINGTON, DISTRICT OF COLUMBIA, ASSIGNOR TO THE L. C. L. CORPORATION, A CORPORATION OF DELAWARE

FREIGHT-CONTAINER CAR

Application filed March 19, 1929. Serial No. 348,309.

Compartment or container freight cars are now in successful use by railroads of the type disclosed in the patents of Alfred H. Smith among which may be noted No. 1,407,593 of February 21, 1922, but in most of these cases it is necessary to employ a crane to lift the container to and from the cars, and such cranes are not at small stations. The McCune Patent No. 1,040,229 of October 1, 1912, provides a sectional or container car, the car having drop sides in front of each container, but this leaves the containers free to be opened while they are on the car.

Prior to the Smith and McCune container cars the methods in handling merchandise freight have not been changed to any marked degree, in that packages of various kinds, shapes, and sizes have been tendered at the railroad platform, taken by railroad labor after unloading from the shipper's truck, and either directly loaded into a car, or, more frequently, placed upon the freight house floor until the car could be loaded, then trucked to the car for relatively long distances and stowed in the car. Due to the usual limitations in available extra space, particularly at larger terminals, in many instances the freight must be loaded currently as offered into the car which often resulted in an ill-assorted and badly loaded car, because it was not possible to reassort and properly load the freight to the best advantage which resulted in transporting very lightly loaded cars and a duplication of service.

The container cars obviated these difficulties and objections. The use of a drop side container car provided for the unloading of the containers from the car at stations not provided with a crane, but this drop side does not prevent the containers from being pilfered while on the car or platform.

The object of my invention is to provide a freight container having means that will prevent the lock of the container door being operated so long as the container rests on the car, or other support, and which will absolutely do away with an opportunity for pilfering whether the side of the car is up or down, therefore the freight in the container is secure against pilfering and the container can be rolled or trucked off the car at small or large stations, deposited on the platform, or a truck, and left without any guard. Therefore, these containers can be unloaded at stations whether the station is open or closed, which results in facilitating the handling of the containers; and with these and other objects in view my invention consists of the parts, and combination of parts hereinafter pointed out.

In the drawings:

Figure 1 is a side elevation of a portion of a drop side car with a container on the car, one of the drop sides being in closed position, while the drop side in front of the container is shown as open or dropped, a portion of the container being shown in section.

Figure 2 is a detail sectional view of the container mounted on a truck.

The reference numeral 3 designates a car of any approved type, having end walls 4. The sides of the car are provided with a number of doors 5 hung on hinges 6 and provided with lock bolts 7 which engage a rigid part 8 of the car to hold the doors in upright position. If desired, additional means may be employed to insure holding the doors in closed position, but this does not form a part of my invention. When it is desired to load or unload a container from a car, the door 5 in front of the container is dropped as shown to the right in Figure 1. Inasmuch as these doors 5 may readily be lowered, it is necessary to provide a lock to prevent the opening of the container doors 2 of the container 9, and it is also necessary that such lock will be equally effective while the container is resting upon a station platform, truck body 1, or other support, all of which involves my invention.

I believe that I am the first to provide a container having legs, with a lock that will hold the container door lock against operation irrespective as to whether the container is resting on its legs, or is bodily supported intermediate its legs, as, for instance, with the body resting on a truck, with the legs elevated from contact with a support.

It will be understood that I do not confine myself to the actual construction, or details of construction shown in the drawings as these will probably be changed in actual manufacture, hence the construction illustrated is selected merely for the purposes of illustrating my invention.

The container 9 is provided with supporting legs or feet 10, at least one of which should be of box like construction, that is to say, provided with four sides and open at top and bottom as clearly shown in the drawing, the upper end opening into the space between the floor 11, and the bottom 12 of the walls of the container.

Suitable brackets 13 are secured to the container structure in which is mounted a rod 14 freely slidable therein, one end of which constitutes a latch adapted to engage a recess 15 in the lower end of the door bolt 16, which door bolt is operated by means of the handle 17 connected to the link 18 to which one end of the door bolt 16 is pivotally attached. Another door bolt 19' is also pivotally attached to the link 18, from which it will be seen that so long as the latch 14 is in the recess 15 of the door bolt 16 it is impossible to move the door bolts to unlocked position.

Within the leg 10, and surrounded by the leg is a weight 19, which is pivotally suspended from one arm 20 of the bell crank lever, said lever being pivoted at 21 to the container structure. The other arm 22 of the bell crank lever is pivotally connected to the outer end of the latch bolt 14, there being a compensating slot 23 in the lever arm 22.

When the container is elevated from the support upon which it has been resting, the weight 19 immediately drops below the bottom edge of the leg 10, whereupon the bell crank lever is rocked on its pivot 21 which results in the latch bolt 14 sliding outwardly and withdrawing from engagement with the recess 15 of the door bolt 16, thus leaving the door bolts free to be moved for unlocking the doors 8 of the container. The bolt 16 passes through opening 24 in floor 11.

In placing the container on any support, the legs come in contact with the support and the weight 19 is thus pushed up into the leg 10 thereby rocking the bell crank lever, which, in turn, slides the latch 14 into the recess 15 of the door bolt 16 as shown in Figure 1.

From the above it will be seen that irrespective of any abutment in front of the container door, the door cannot be unlocked so long as the legs of the container rest upon a support, and the container is proof against pilfering, therefore these containers may safely be unloaded at a station day or night and left without guard as the freight is as safe, perhaps safer, than it would be if stored in the station freight house. Another advantage is that a shipper may safely leave his packed containers on a station platform to be picked up by a car sometime during the day or night.

The lock thus far described is operative to hold the door lock against operation so long as the container legs are resting on a support, but as soon as the container legs are elevated from such support, as, for instance, when the container is lifted bodily on a lift truck the weighted member 19 is free to drop, and thus free the door lock for operation which, of course, is not a desirable condition, and in order to eliminate such a condition I provide the locking or latch bar 14 with a pivot 24. A weighted locking dog 25 is pivotally mounted on the container, the short arm of which is connected to the pivot pin 24 on the lock bar 14 so that when a container is supported on a lift truck 1, or other support, as shown in Figure 2, the auxiliary weighted dog 25 is in contact with the platform of the truck and held in that position so long as the container is thus supported, and consequently the latch 14 is held in locked engagement with the door bolt 16.

The lift truck platform is pushed under the container legs, and as the truck platform is elevated it comes into contact with the auxiliary locking dog 25 before the container legs are entirely lifted free from the support upon which they are resting, therefore if the weighted element has withdrawn the latch 14, partially, or fully from engagement with the door bolt 16, the pin 24 of the auxiliary locking dog 25 will, when the dog 25 is moved on its pivot by contact with the platform of the lifting truck, move and hold the latch 14 into locking engagement with the door bolt 16 and maintain such interlocking engagement and prevent the operation of the door lock so long as the container is thus supported on the lift truck platform.

The advantage of mounting these containers on legs is that the container body is spaced from the support on which it is placed, which permits of running a lift truck under the container for the purpose of moving it from place to place.

What I claim is:

1. In combination, a support, a freight container having legs and removably mounted on said support, a door for the container, a locking bolt for the door, and means carried by the container holding the door bolts against operation so long as the legs or the body of the container rest on a support.

2. In combination with a container having legs, a door, and a door lock, means carried by the container holding the door lock against operation so long as the legs or the body of the container rest on a support.

3. In combination with a freight container, having legs, a door, and a door lock, a latch adapted to have locking engagement with the door lock, means within one of the container legs connected with said latch, and extending below the bottom edge of the leg when the container is elevated, and means carried by the container body and connected with said latch, said means in the leg being operated to move and hold the latch in locking engagement with the door lock so long as the legs rest upon a support, and said means carried by the support being operated to hold the latch in locking engagement with the door lock and hold the lock against operation so long as the container body rests on a support with the legs elevated from a support.

4. In combination with a freight container having legs, a door, and a door lock, of a latch bar carried by the container and adapted to have interlocking engagement with the door lock, a movable element mounted in one of the legs of the container and operatively connected with the latch, and a movable element carried by the container body and operatively connected with said latch whereby the said movable elements are adapted to hold the said latch in locking engagement with and hold the said lock against operation under different conditions.

In testimony whereof I affix my signature.

EDWIN S. CLARKSON.